United States Patent
Weyhrauch et al.

(10) Patent No.: US 7,116,062 B2
(45) Date of Patent: Oct. 3, 2006

(54) METHOD OF SOFT-STARTING A SWITCHING POWER SUPPLY INCLUDING PULSE WIDTH MODULATION CIRCUIT

(75) Inventors: Ernest C. Weyhrauch, Cookeville, TN (US); George B. Kendrick, Lexington, KY (US); Matthew B. Ballenger, Lexington, KY (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 11/096,643

(22) Filed: Apr. 1, 2005

(65) Prior Publication Data

US 2005/0151488 A1    Jul. 14, 2005

(51) Int. Cl.
*H05B 37/02* (2006.01)
*G05B 24/02* (2006.01)

(52) U.S. Cl. .......................... 315/209 SC; 315/209 T; 315/209 R; 315/224; 323/320; 323/325

(58) Field of Classification Search ................. None
See application file for complete search history.

(56) References Cited

U.S. PATENT DOCUMENTS

| | | | |
|---|---|---|---|
| 3,275,922 A | 9/1966 | Meyer et al. | 321/15 |
| 3,869,631 A | 3/1975 | Anderson et al. | 313/217 |
| 4,480,211 A | 10/1984 | Eggers | 315/70 |
| 4,500,813 A | 2/1985 | Weedall | 315/276 |
| 4,893,063 A | 1/1990 | Pernyeszi | 315/307 |
| 4,922,155 A | 5/1990 | Morris et al. | 315/205 |
| 5,519,311 A * | 5/1996 | Widmayer | 323/319 |
| 5,859,506 A | 1/1999 | Lemke | 315/308 |
| 6,208,090 B1 | 3/2001 | Skilskyj et al. | 315/360 |
| 6,445,133 B1 | 9/2002 | Lin et al. | 315/57 |

* cited by examiner

*Primary Examiner*—Tuyet Thi Vo
(74) *Attorney, Agent, or Firm*—Carlo S. Bessone

(57) ABSTRACT

A method of operating a power controller that converts a line voltage to an RMS load voltage includes a soft start in which a duty cycle of a pulse width modulation circuit is gradually increased to a steady state value that defines the RMS load voltage. The controller has a circuit with a time-based signal source that triggers conduction independently of line voltage magnitude and a transistor switch whose gate receives signals from the time-based signal source to trigger the circuit. When starting the power controller, a microcontroller increases the duty cycle of the pulse width modulation circuit in plural steps to provide the soft start.

3 Claims, 9 Drawing Sheets

US 7,116,062 B2

METHOD OF SOFT-STARTING A SWITCHING POWER SUPPLY INCLUDING PULSE WIDTH MODULATION CIRCUIT

BACKGROUND OF THE INVENTION

The present invention is directed to a method of operating a power controller that supplies a specified power to a load, and more particularly to a method of starting a voltage converter that converts line voltage to a suitable RMS load voltage, and to a lamp with a soft-start power supply.

Some loads, such as lamps, operate at a voltage lower than a line (or mains) voltage of, for example, 120V or 220V, and for such loads a voltage converter that converts line voltage to a lower operating voltage must be provided. The power supplied to the load may be controlled with a phase-control clipping circuit that typically includes an RC circuit. Moreover, some loads operate most efficiently when the power is constant (or substantially so). However, line voltage variations are magnified by these phase-control clipping circuits due to their inherent properties (as will be explained below) and the phase-control clipping circuit is desirably modified to provide a (more nearly) constant RMS load voltage.

A simple four-component RC phase-control clipping circuit demonstrates a problem of conventional phase-control clipping circuits. The phase-controlled clipping circuit shown in FIG. 1 has a capacitor 22, a diac 24, a triac 26 that is triggered by the diac 24, and resistor 28. The resistor 28 may be a potentiometer that sets a resistance in the circuit to control a phase at which the triac 26 fires.

In operation, a clipping circuit such as shown in FIG. 1 has two states. In the first state the diac 24 and triac 26 operate in the cutoff region where virtually no current flows. Since the diac and triac function as open circuits in this state, the result is an RC series network such as illustrated in FIG. 2. Due to the nature of such an RC series network, the voltage across the capacitor 22 leads the line voltage by a phase angle that is determined by the resistance and capacitance in the RC series network. The magnitude of the capacitor voltage $V_C$ is also dependent on these values.

The voltage across the diac 24 is analogous to the voltage drop across the capacitor 22 and thus the diac will fire once breakover voltage $V_{BO}$ is achieved across the capacitor. The triac 26 fires when the diac 24 fires. Once the diac has triggered the triac, the triac will continue to operate in saturation until the diac voltage approaches zero. That is, the triac will continue to conduct until the line voltage nears zero crossing. The virtual short circuit provided by the triac becomes the second state of the clipping circuit as illustrated in FIG. 3.

Triggering of the triac 26 in the clipping circuit is forward phase-controlled by the RC series network and the leading portion of the line voltage waveform is clipped until triggering occurs as illustrated in FIGS. 4–5. A load attached to the clipping circuit experiences this clipping in both voltage and current due to the relatively large resistance in the clipping circuit.

Accordingly, the RMS load voltage and current are determined by the resistance and capacitance values in the clipping circuit since the phase at which the clipping occurs is determined by the RC series network and since the RMS voltage and current depend on how much energy is removed by the clipping.

With reference to FIG. 6, clipping is characterized by a conduction angle α and a delay angle θ. The conduction angle is the phase between the point on the load voltage/current waveforms where the triac begins conducting and the point on the load voltage/current waveform where the triac stops conducting. Conversely, the delay angle is the phase delay between the leading line voltage zero crossing and the point where the triac begins conducting.

Define $V_{irrms}$ as RMS line voltage, $V_{orms}$ as RMS load voltage, T as period, and ω as angular frequency (rad) with $\omega=2\pi f$.

Line voltage may vary from location to location up to about 10% and this variation can cause a harmful variation in RMS load voltage in the load (e.g., a lamp). For example, if line voltage were above the standard for which the voltage conversion circuit was designed, the triac 26 may trigger early thereby increasing RMS load voltage. In a halogen incandescent lamp, it is particularly desirable to have an RMS load voltage that is nearly constant.

Changes in the line voltage are exaggerated at the load due to a variable conduction angle, and conduction angle is dependent on the rate at which the capacitor voltage reaches the breakover voltage of the diac. For fixed values of frequency, resistance and capacitance, the capacitor voltage phase angle ($\theta_C$) is a constant defined by $\theta_C=\arctan(-\omega RC)$. Therefore, the phase of $V_C$ is independent of the line voltage magnitude. However, the rate at which $V_C$ reaches $V_{BO}$ is a function of $V_{irrms}$ and is not independent of the line voltage magnitude.

FIG. 7 depicts two possible sets of line voltage $V_i$ and capacitor voltage $V_C$. As may be seen therein, the rate at which $V_C$ reaches $V_{BO}$ varies depending on $V_{irrms}$. For RC phase-control clipping circuits the point at which $V_C=V_{BO}$ is of concern because this is the point at which diac/triac triggering occurs. As $V_{irrms}$ increases, $V_C$ reaches $V_{BO}$ earlier in the cycle leading to an increase in conduction angle ($\alpha_2 > \alpha_1$), and as $V_{irrms}$ decreases, $V_C$ reaches $V_{BO}$ later in the cycle leading to a decrease in conduction angle ($\alpha_2 < \alpha_1$).

Changes in $V_{irrms}$ leading to exaggerated or disproportional changes in $V_{orms}$ are a direct result of the relationship between conduction angle and line voltage magnitude. As $V_{irrms}$ increases, $V_{orms}$ increases due to both the increase in peak voltage and the increase in conduction angle, and as $V_{irrms}$ decreases, $V_{orms}$ decreases due to both the decrease in peak voltage and the decrease in conduction angle. Thus, load voltage is influenced twice, once by a change in peak voltage and once by a change in conduction angle, resulting in unstable RMS load voltage conversion for the simple phase-control clipping circuit.

When the phase-control power controller is used in a voltage converter of a lamp, the voltage converter may be provided in a fixture to which the lamp is connected or within the lamp itself. U.S. Pat. No. 3,869,631 is an example of the latter, in which a diode is provided in the lamp base for clipping the line voltage to reduce RMS load voltage at the light emitting element. U.S. Pat. No. 6,445,133 is another example of the latter, in which transformer circuits are provided in the lamp base for reducing the load voltage at the light emitting element.

Each of these devices is a power controller that converts the line voltage to an RMS load voltage and that includes a circuit that clips (in references '804, '801, and '826) or modulates (in reference '802) the load voltage to provide the RMS load voltage. The amount of clipping or modulation in the circuit is defined by a time-based signal source that triggers conduction in the circuit independently of line voltage magnitude. The circuit includes a transistor switch whose gate receives signals from the time-based signal source to trigger operation of the circuit. The power controller may be in a voltage conversion circuit that converts a line voltage at a lamp terminal to the RMS load voltage usable by a light emitting element of the lamp.

The present inventors have found that these power controllers, which have a time-based pulse source that triggers conduction in the circuit independently of line voltage magnitude, offer opportunities for yet further improvements in lamps and other devices that use these power controllers. The present invention seeks to take advantage of these opportunities.

SUMMARY OF THE INVENTION

Accordingly, an object of the present invention is to provide a novel method of operating a power controller that converts a line voltage to an RMS load voltage independently of variations in line voltage magnitude.

A further object is to provide a novel method of soft-starting a power controller that uses a time-based pulse source to trigger a clipping or modulation circuit by gradually increasing a conduction angle in the clipping circuit or gradually increasing a duty cycle in the modulation circuit.

A still further object is to provide a lamp with this soft-start power controller in a voltage conversion circuit that converts a line voltage at a lamp terminal to the RMS load voltage usable by a light emitting element of the lamp.

DESCRIPTION OF PREFERRED EMBODIMENTS

Figure 1:
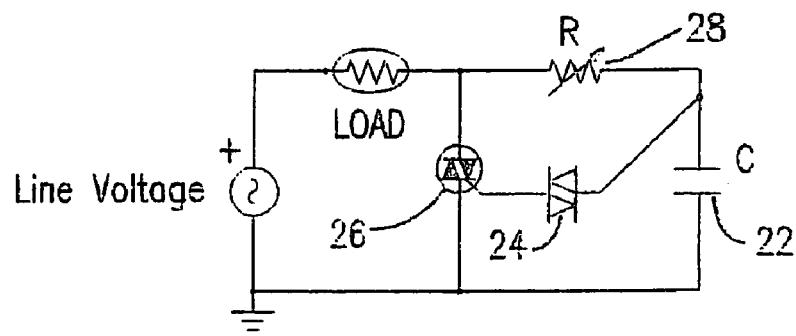
FIG. 1 is a schematic circuit diagram of a phase-controlled clipping circuit of the prior art.
Figure 2:
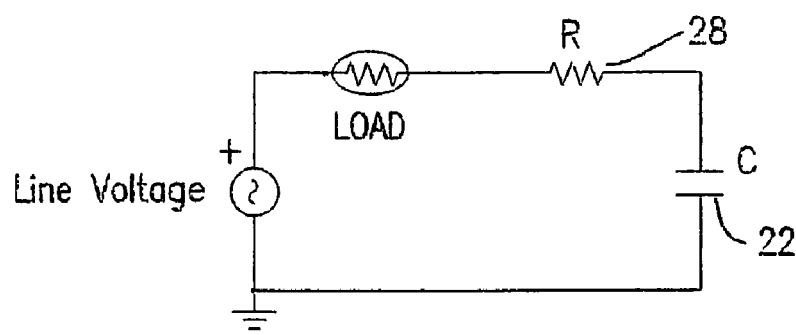
FIG. 2 is a schematic circuit diagram of the phase-controlled dimming circuit of FIG. 1 showing an effective state in which the triac is not yet triggered.
Figure 3:
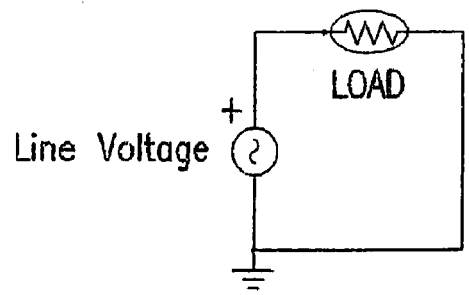
FIG. 3 is a schematic circuit diagram of the phase-controlled dimming circuit of FIG. 1 showing an effective state in which the triac has been triggered.
Figure 4:
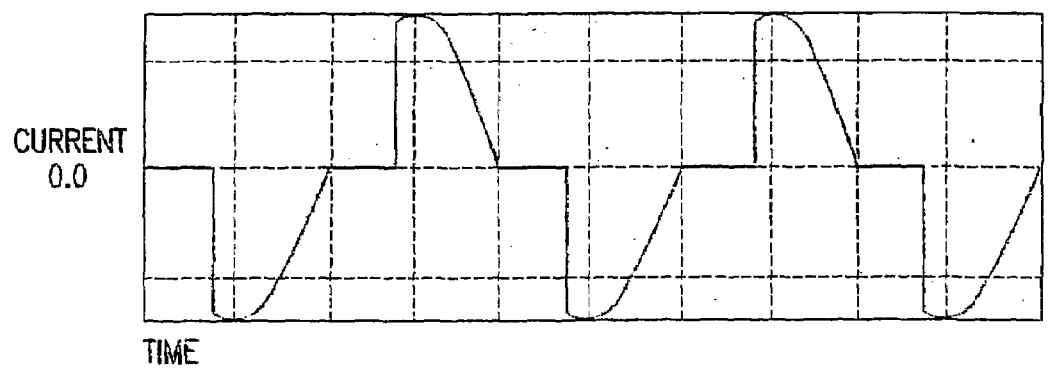
FIG. 4 is a graph illustrating current clipping in the phase-controlled dimming circuit of FIG. 1.
Figure 5:
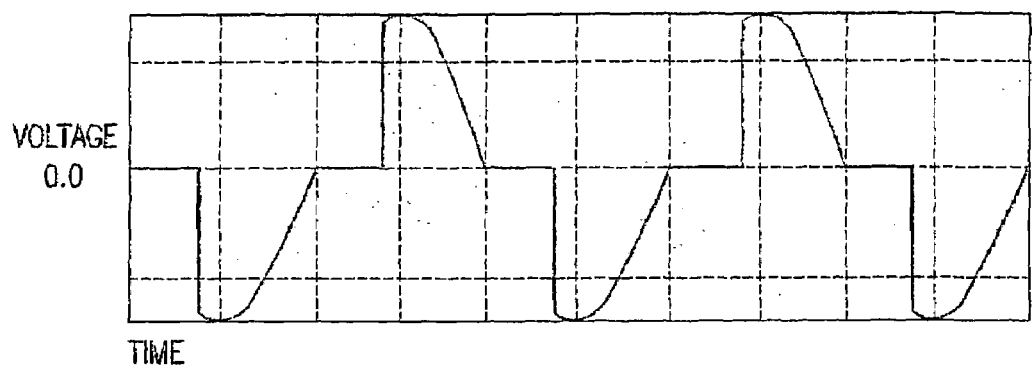
FIG. 5 is a graph illustrating voltage clipping in the phase-controlled dimming circuit of FIG. 1.
Figure 6:
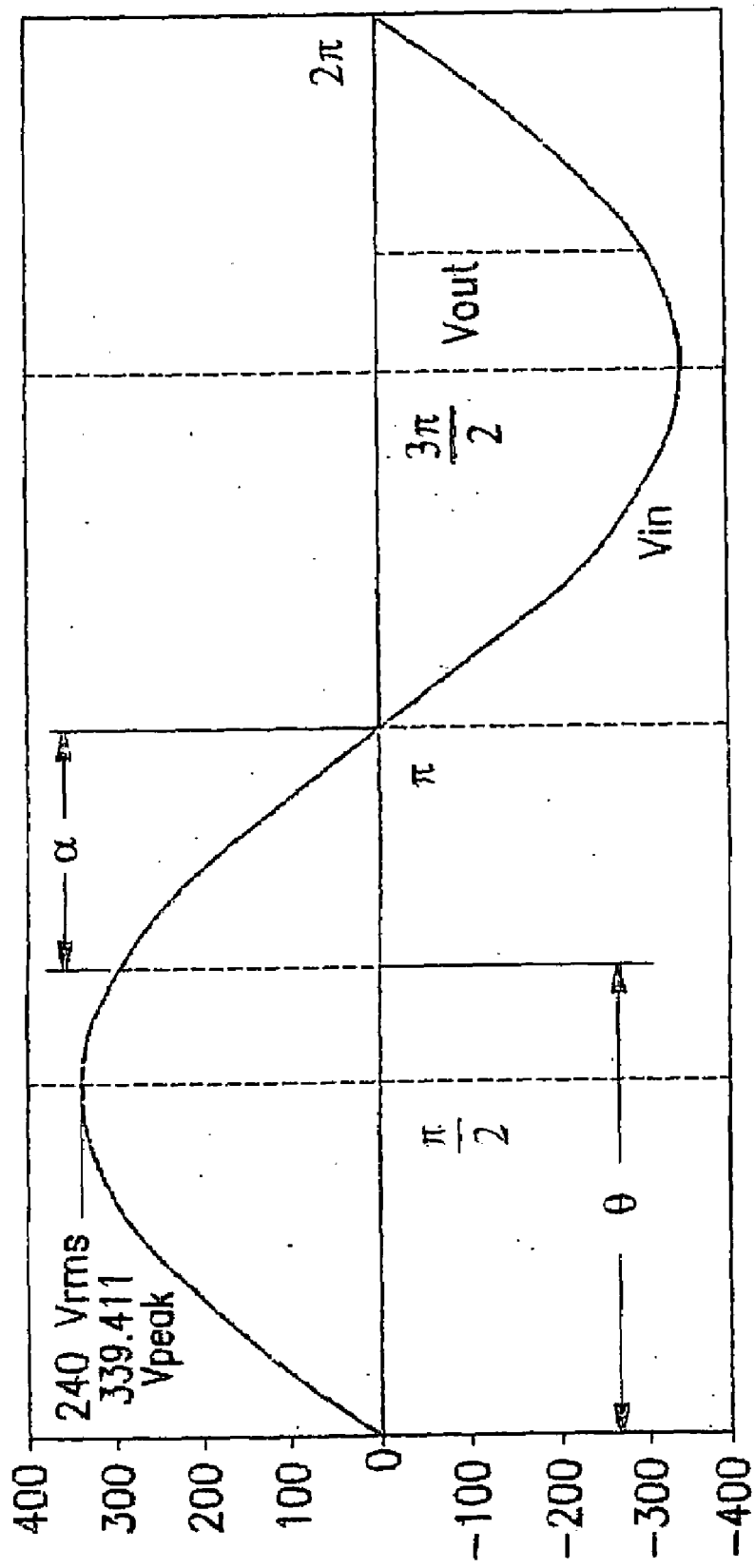
FIG. 6 is a graph showing the conduction angle α.
Figure 7:
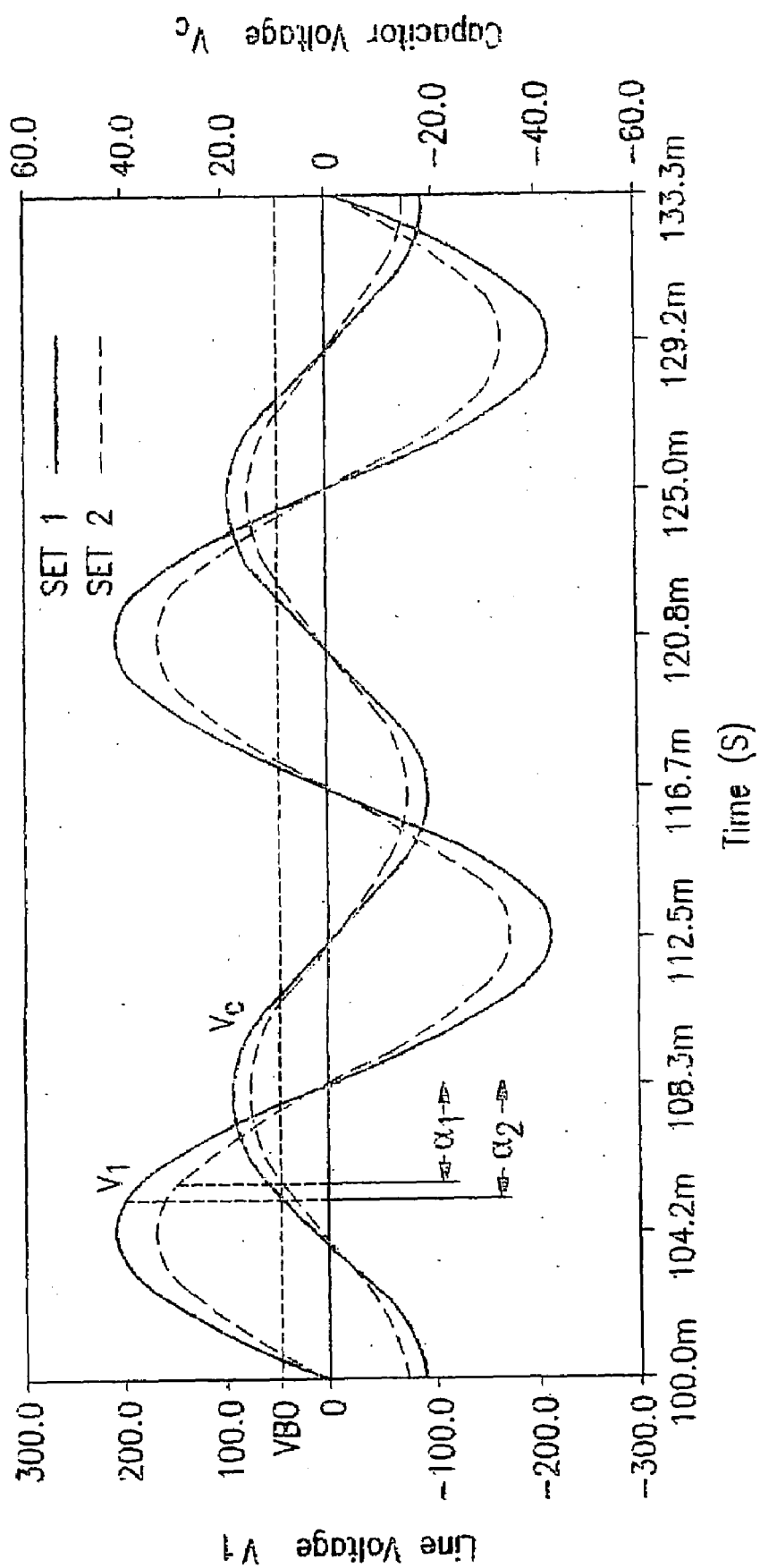
FIG. 7 is a graph showing how changes in the magnitude of the line voltage affect the rate at which capacitor voltage reaches the diac breakover voltage.
Figure 8:
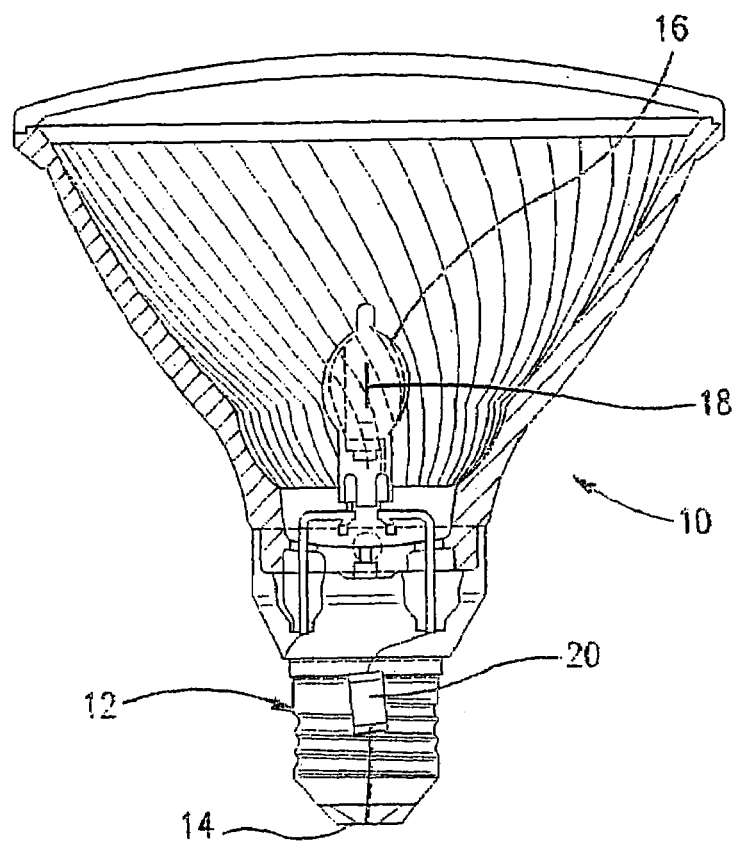
FIG. 8 is a partial cross section of an embodiment of a lamp of the present invention.

With reference to FIG. 8, a lamp 10 includes a base 12 with a lamp terminal 14 that is adapted to be connected to line (mains) voltage, a light-transmitting envelope 16 attached to the base 12 and housing a light emitting element 18 (an incandescent filament in the embodiment of FIG. 8), and a voltage conversion circuit 20 for converting a line voltage at the lamp terminal 14 to a lower operating voltage. The voltage conversion circuit 20 may be within the base 12 and connected between the lamp terminal 14 and the light emitting element 18. The voltage conversion circuit 20 may be an integrated circuit in a suitable package as shown schematically in FIG. 8.

While FIG. 8 shows the voltage conversion circuit 20 in a parabolic aluminized reflector (PAR) halogen lamp, the voltage conversion circuit 20 may be used in any incandescent lamp when placed in series between the light emitting element (e.g., filament) and a connection (e.g., lamp terminal) to a line voltage. Further, the voltage conversion circuit described and claimed herein finds application other than in lamps and is not limited to lamps.

Figure 9:
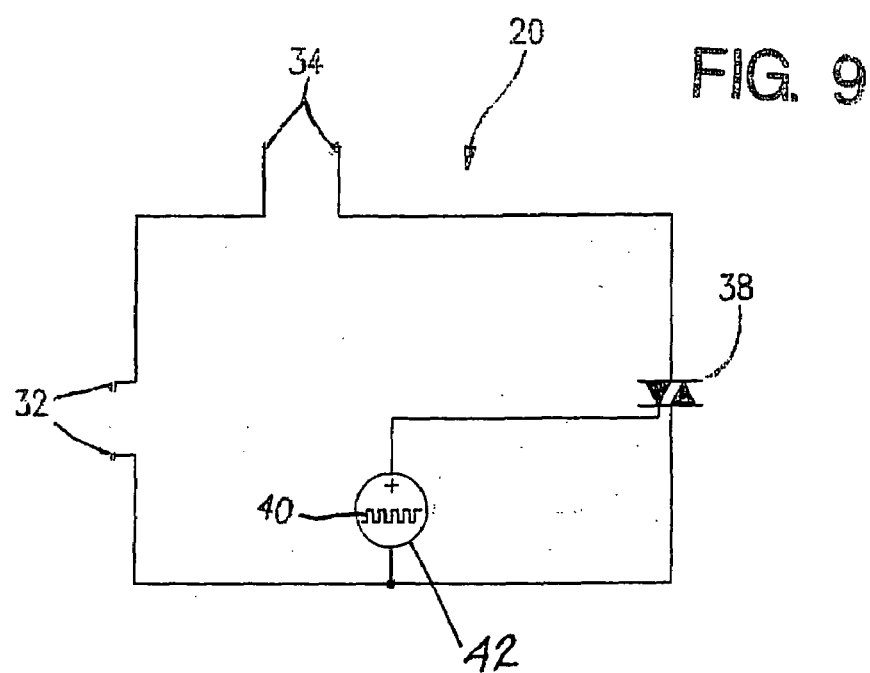
FIG. 9 is a schematic circuit diagram showing a first embodiment of the power controller of the present invention suitable for forward clipping.

With reference to FIG. 9 that illustrates an embodiment of the present invention, the voltage conversion circuit 20 clips or modulates the load voltage (as explained in the above cited applications that were incorporated by reference) and includes line terminals 32 for a line voltage, load terminals 34 for a load voltage, a transistor switch 38, a time-based signal source 40 that sends signals to a gate of the transistor switch 38 to trigger conduction in the voltage conversion circuit independently of line voltage magnitude, and a microcontroller 42 that may be part of time-based signal source 40 or provided separately and that controls the timing of the signals from time-based signal source 40. The embodiment of FIG. 9 shows a triac as the transistor switch 38 and is suitable for forward phase control clipping.

The time-based signal source 40 may be any suitable signal source that is capable of sending signals at constant time intervals to a gate of the transistor switch 38, including a pulse generator, a microcontroller and a clock. The microcontroller may be any suitable device that operates a signal control program by which timing of the signals from the time-based signal source are controlled. The signals from the time-based signal source should have a positive polarity at the gate of the transistor switch to provide the forward, reverse or forward/reverse hybrid clipping.

Figure 10:
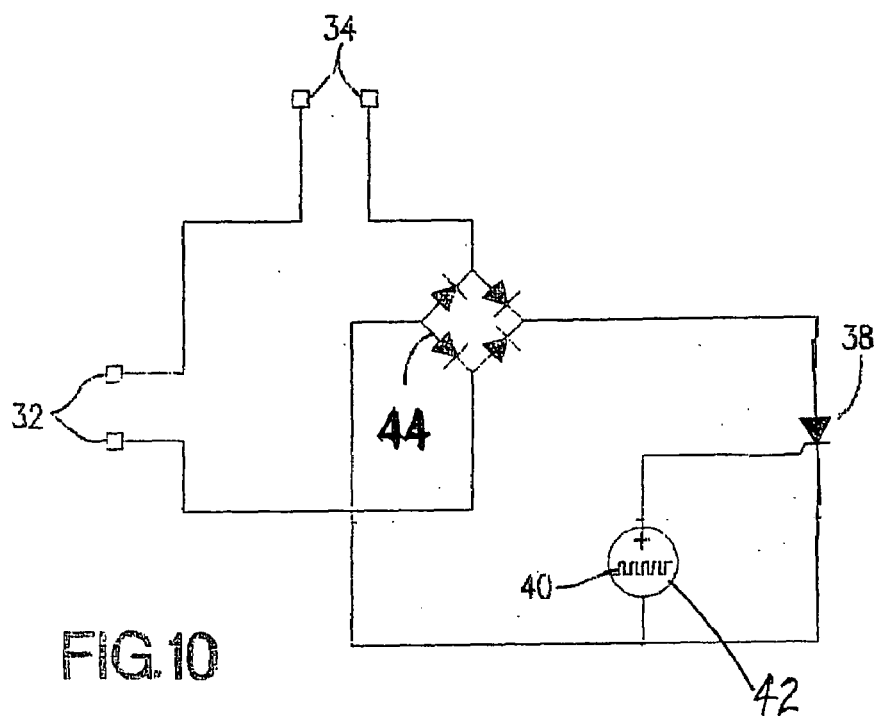
FIG. 10 is a schematic circuit diagram showing a second embodiment of the power controller of the present invention also suitable for forward clipping.

A further embodiment that is also suitable for forward clipping is shown in FIG. 10 in which the transistor switch 38 is an SCR solid state conduction device. This embodiment includes a full-wave bridge 44.

Figure 11:
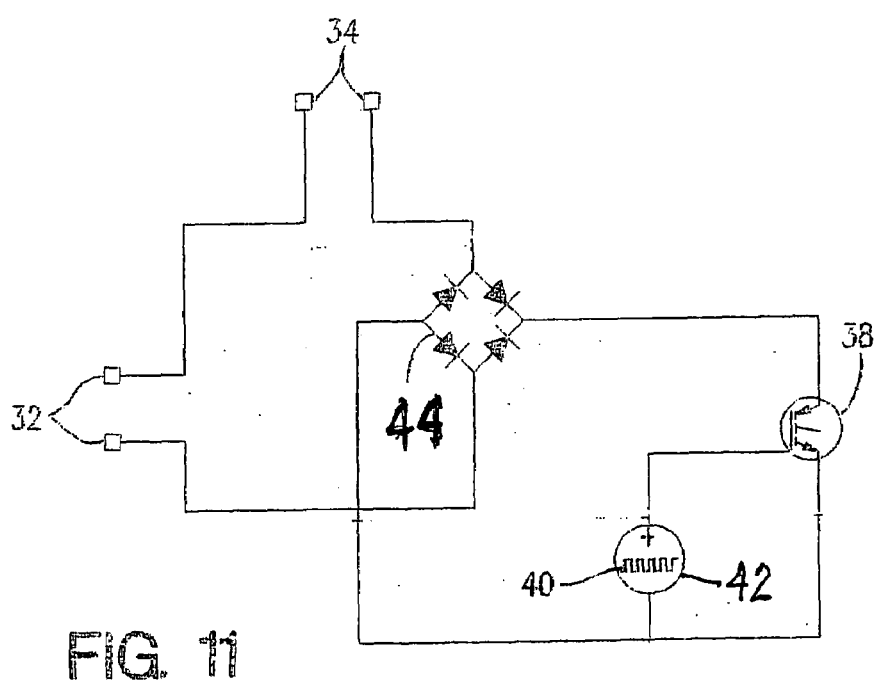
FIG. 11 is a schematic circuit diagram showing a third embodiment of the power controller of the present invention suitable for forward, reverse, and forward/reverse hybrid clipping and for pulse width modulation.

Yet a further embodiment that is suitable for forward, reverse, and forward/reverse hybrid clipping and pulse width modulation is shown in FIG. 11. This embodiment includes full-wave bridge 44 and an insulated gate bipolar transistor (IGBT) that is the transistor switch 38.

Operation of the power controllers in FIGS. 9–11 is explained in the above-mentioned applications that were incorporated by reference, the particulars of which need not be repeated herein. In general, the time-based signal source 40 generates pulses that are timed to coincide with the conduction regions or modulation cycle of the power controller. The time-based signal source 40 sustains the pulses for the entirety of each period the transistor switch 38 is to be conducting. Some form of synchronization of the pulses with the load voltage waveform is also necessary (synchronization techniques being known and not the subject of the present application).

The present invention is suitable for each of these power controllers. When the lamp (or other load) is starting, microcontroller 42 increases one of a rate and duration of the signals from the time-based signal source 40 sent to the gate of the transistor switch 38 in plural steps from a first value to a steady state value that defines the RMS load voltage. That is, the microcontroller gradually increases the conduction angle of phase-control power controllers or gradually increases the duty cycle of pulse width modulation power controllers from a value at which the RMS load voltage is very small to a larger value that defines the steady state RMS load voltage in order to provide a soft start for the lamp. Later, during subsequent operation of the lamp, the time-based signal source 40 sends the signals at constant time intervals to the gate of the transistor switch to cause the voltage conversion circuit to provide the RMS load voltage independently of line voltage magnitude.

Figure 12:
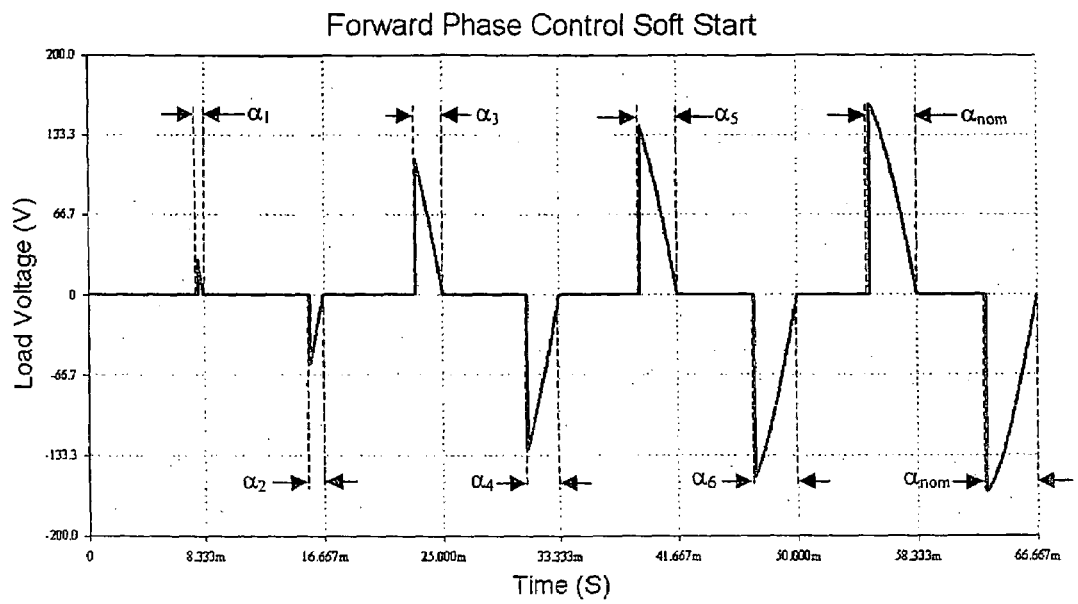
FIG. 12 is a graph depicting the gradual increase in conduction angle in a forward clipping embodiment of the present invention.

In one embodiment, and as explained in the above-mentioned '804 application, the voltage conversion circuit clips the load voltage immediately following each polarity change of the load voltage (forward clipping). In this event, the duration of each of the signals from time-based signal source 40 is increased when starting the power controller to increase a conduction angle of the circuit, such as shown in FIG. 12. The soft start is achieved by increasing the conduction angle from a starting value $\alpha_1$ to the nominal value $\alpha_{nom}$ that defines the desired RMS voltage, where the conduction angle increases with each cycle or half cycle so that $\alpha_1 < \alpha_2 < \alpha_3 < \alpha_4 < \alpha_5 < \alpha_6 < \alpha_{nom}$.

Figure 13:
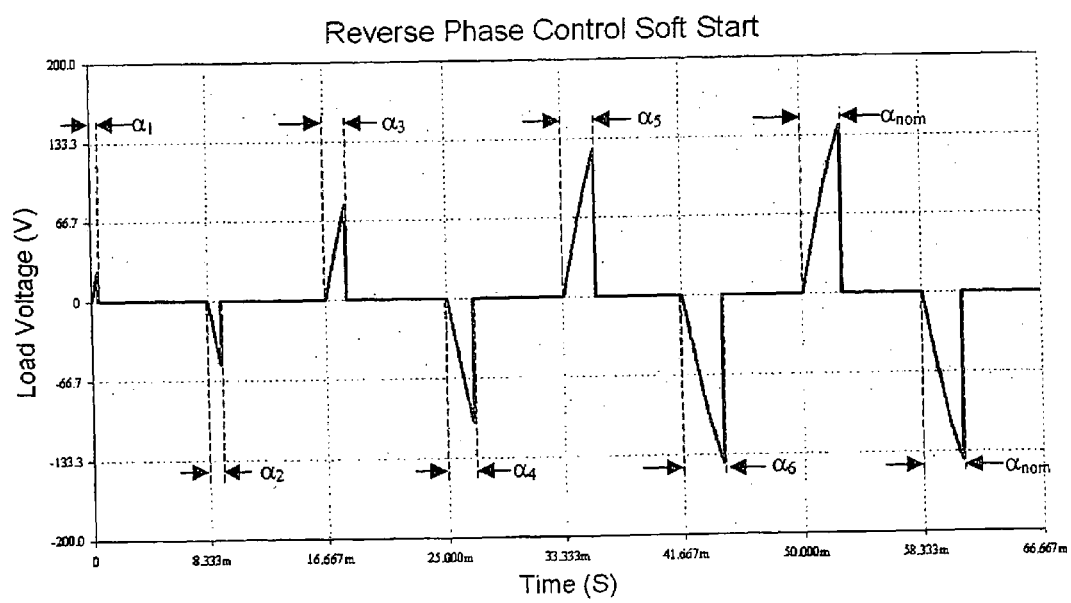
FIG. 13 is a graph depicting the gradual increase in conduction angle in a reverse clipping embodiment of the present invention.

In another embodiment, and as explained in the above-mentioned '801 application, the voltage conversion circuit clips the load voltage immediately before each polarity change of the load voltage (reverse clipping). In this event, the duration of each of the signals from the time-based signal source 40 is increased when starting the power controller to increase a conduction angle of the circuit, such as shown in FIG. 13. The soft start is achieved by increasing the conduction angle from a starting value $\alpha_1$ to the nominal value $\alpha_{nom}$ that defines the desired RMS voltage, where the conduction angle increases with each cycle or half cycle so that $\alpha_1 < \alpha_2 < \alpha_3 < \alpha_4 < \alpha_5 < \alpha_6 < \alpha_{nom}$.

Figure 14:
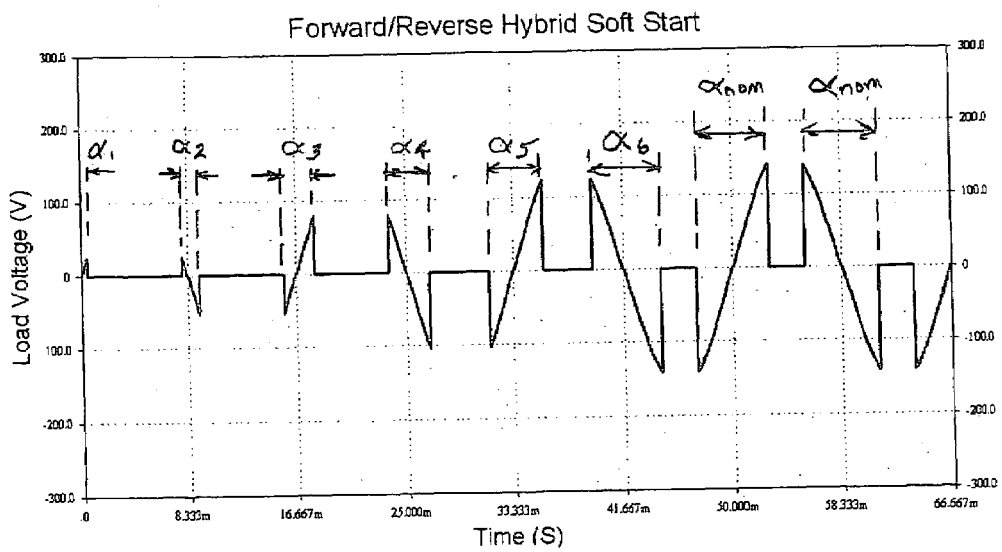
FIG. 14 is a graph depicting the gradual increase in conduction angle in a forward/reverse hybrid clipping embodiment of the present invention.

In yet another embodiment, and as explained in the above mentioned '826 application, the voltage conversion circuit clips the load voltage in a region of the cycle of the load voltage that includes a peak value between adjacent polarity changes of the load voltage (forward/reverse hybrid clipping). In this event (which is, in effect, a composite of the above two embodiments), the time-based signal source sends the signals to the gate of the transistor switch to cause the transistor switch to be ON during time periods that span from before to after polarity changes of the load voltage and to be OFF between the time periods. The duration of each of the signals is increased when starting the power controller to increase a conduction angle of the circuit, such as shown in FIG. 14. The soft start is achieved by increasing the conduction angle from a starting value $\alpha_1$ to the nominal value $\alpha_{nom}$ that defines the desired RMS voltage, where the conduction angle increases with each cycle or half cycle so that $\alpha_1 < \alpha_2 < \alpha_3 < \alpha_4 < \alpha_5 < \alpha_6 < \alpha_{nom}$.

Figure 15:
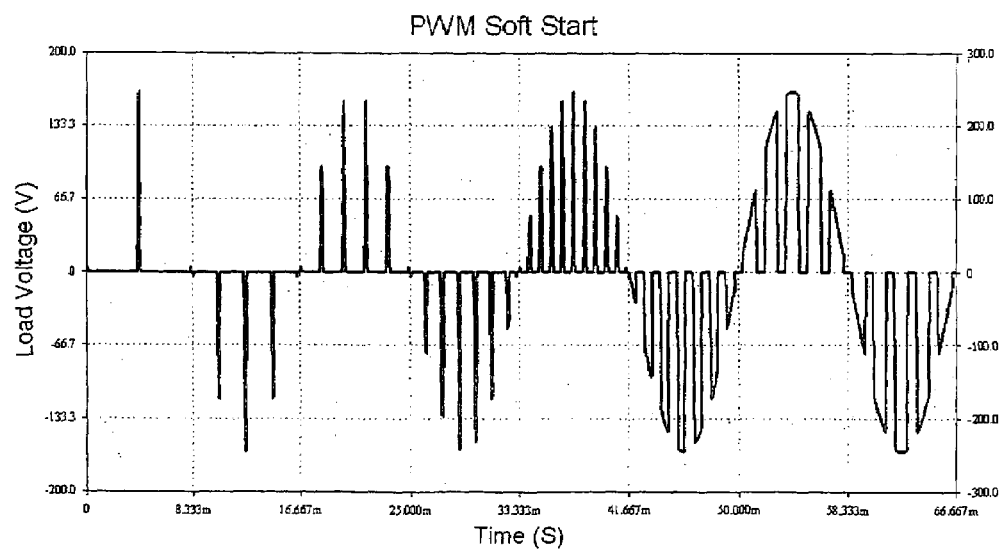
FIG. 15 is a graph depicting the gradual increase in frequency and/or duration of the duty cycle in a pulse width modulation embodiment of the present invention.

In a still further embodiment, and as explained in the above mentioned '802 application, the voltage conversion circuit modulates the load voltage at a frequency higher than that of the load voltage. In this event, the time-based signal source sends the signals to the gate of the transistor switch to cause the transistor switch to be ON and OFF at the modulation frequency. The frequency and/or duration of the signals are increased when starting the power controller to increase a duty cycle of the circuit, such as shown in FIG. 15 (which shows increases in both frequency and duration, it being understood that one or the other or both may be increased in the present invention). The soft start is achieved by increasing the duty cycle from a starting value to the nominal value that defines the desired RMS voltage, where the duty cycle increases with each cycle or half cycle.

Conventional RC phase-control clipping circuits are very sensitive to fluctuations in the line voltage magnitude. The present invention provides a power controller that operates substantially independently of the line voltage magnitude by incorporating time-based pulses to trigger conduction, thereby reducing variation of the conduction angle compared to conventional RC phase-control circuits. Further, the soft-start provided by the present invention eases the load conditions during start. For example, an incandescent filament may have longer life if started with the soft-start provided herein.

Figure 16:
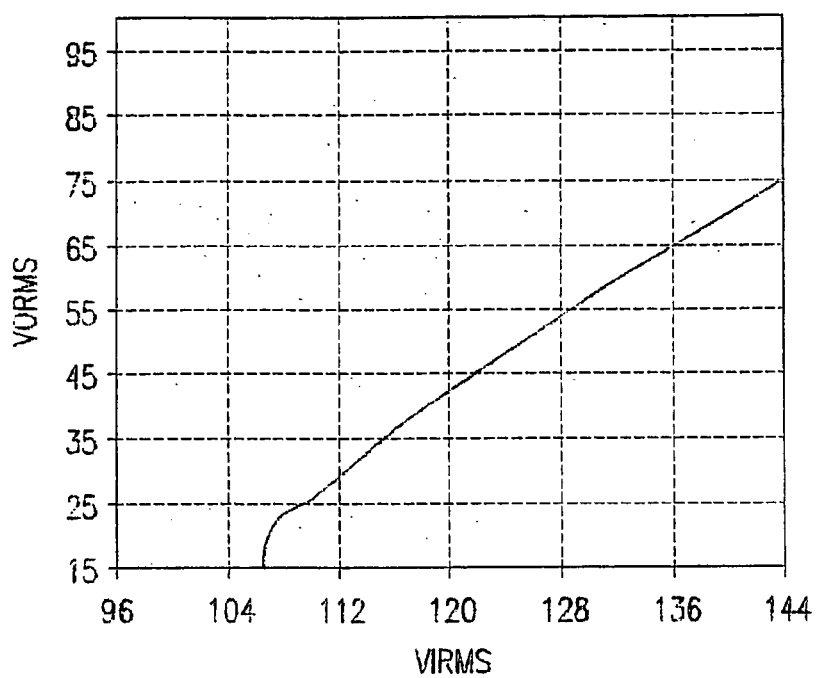
FIG. 16 is a graph of $V_{orms}$ versus $V_{irms}$ for a conventional RC phase-control power controller designed to produce 42 $V_{rms}$ output for 120 $V_{rms}$ input.
Figure 17:
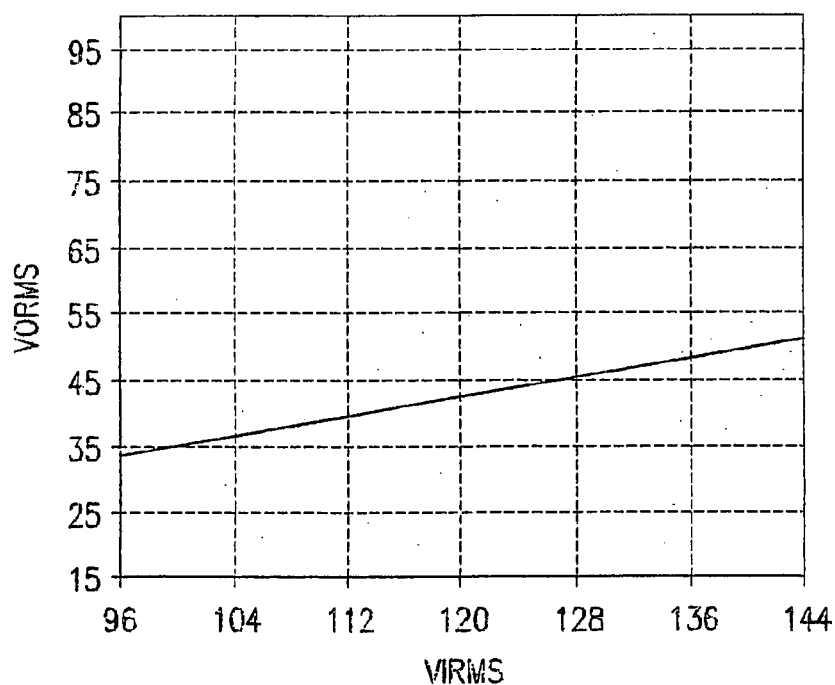
FIG. 17 is a graph of $V_{orms}$ versus $V_{irms}$ for a fixed phase forward/reverse hybrid phase-control power controller incorporating the present invention and designed to produce 42 $V_{rms}$ output for 120 $V_{rms}$ input.

FIGS. 16 and 17 illustrate the improvement afforded by the present invention. FIG. 16 shows relationship between $V_{orms}$ and $V_{irms}$ in a prior art RC phase-control clipping circuit, while FIG. 17 shows the relationship for the present invention. In each instance the circuit is designed to produce 42 $V_{rms}$ output for a 120 $V_{rms}$ input. Note that the output voltage varies considerably more in FIG. 16 than in FIG. 17.

The description above refers to use of the present invention in a lamp. The invention is not limited to lamp applications, and may be used more generally where resistive or inductive loads (e.g., motor control) are present to convert an unregulated AC line or mains voltage at a particular frequency or in a particular frequency range to a regulated RMS load voltage of specified value.

While embodiments of the present invention have been described in the foregoing specification and drawings, it is to be understood that the present invention is defined by the following claims when read in light of the specification and drawings.

What is claimed is:

1. A method of operating a power controller that converts a line voltage to an RMS load voltage and that has a pulse width modulation circuit that pulse width modulates a load voltage to define a duty cycle that sets the RMS load voltage, the circuit including a time-based signal source that sends signals to trigger conduction in the circuit independently of line voltage magnitude and a transistor switch whose gate receives the signals from the time-based signal source, the method comprising the steps of:

when starting the power controller, increasing the duty cycle of the pulse width modulation circuit, the duty cycle increasing in plural steps from a first value to a steady state value; and during subsequent operation of the power controller, sending the signals from the time-based signal source with the steady state value of the duty cycle at constant time intervals to the gate of the transistor switch to cause the power controller to provide the RMS load voltage independently of line voltage magnitude.

2. The method of claim 1, wherein the pulse width modulation circuit includes a microcontroller that sets the duty cycle by controlling timing of the signals from the time-based signal source and the method further comprises the step of a user selecting in the microcontroller at least one of a frequency and duration of the duty cycle.

3. The method of claim 1, wherein the step of increasing the duty cycle comprises the step of increasing the duty cycle in each of plural consecutive cycles of the load voltage.

* * * * *